Nov. 23, 1943.  I. POMIERANIEC  2,335,132
PLANTING MACHINE
Filed Dec. 31, 1941
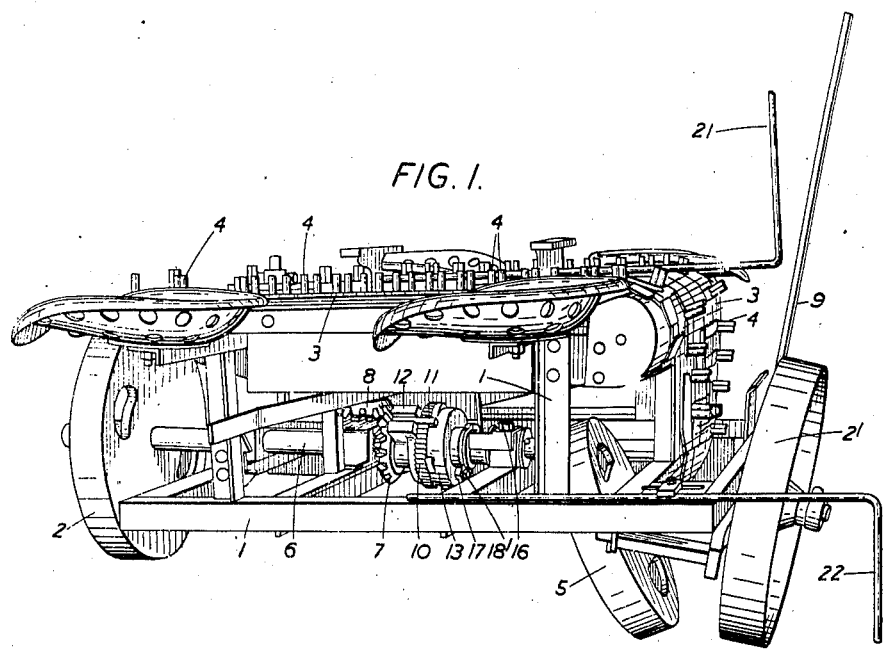
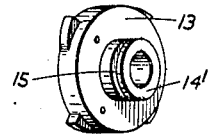
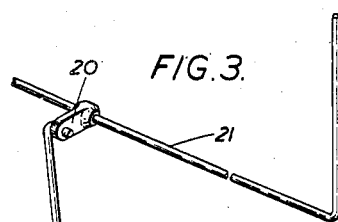
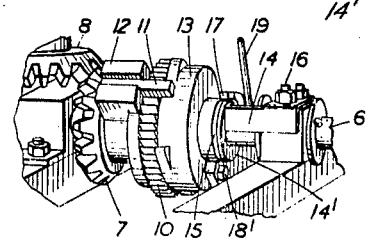 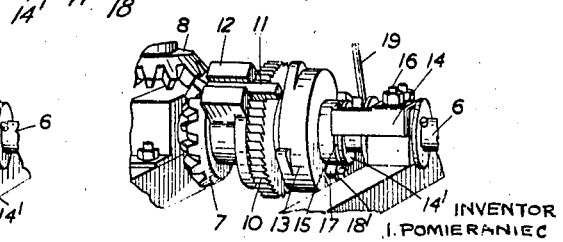
INVENTOR
I. POMIERANIEC
BY Blair + Alcorne
ATTORNEYS Patented Nov. 23, 1943

2,335,132

UNITED STATES PATENT OFFICE 2,335,132

PLANTING MACHINE

Israel Pomieraniec, Golders Green, London, England, assignor to Transplanters (Robot) Limited, St. Albans, Hertfordshire, England, a British company Application December 31, 1941, Serial No. 425,194
In Great Britain December 23, 1940

9 Claims. (Cl. 111—2)

This invention relates to improvements in or relating to planting machines and is particularly, but not necessarily exclusively, applicable to machines for planting such plants as cabbage or tobacco plants, bulbs, saplings or the like, all of which are embraced by the term "plant" as used herein.

It is frequently desired to plant plants in such a way that they are in alignment not only in rows extending in one direction but also in rows extending in a direction at right angles to said first named direction. In practice this is found to be difficult or impossible with existing planting machines in which the plant conveying and/or planting devices are driven from one or more wheels which run on the ground since such wheels may slip and even if the machine commences to position plants in transverse alignment such alignment may soon be upset. In some of the previously proposed planting machines a clutch has been incorporated in the transmission from the road wheels to the planting mechanism but in such proposals the abovementioned difficulty has not been minimised to any material extent because in such known arrangements the mere engagement of the clutch does not by itself determine the precise position in which a plant will be delivered or planted, such position being also dependent upon the position of the transmission mechanism at the moment of engagement and it will be readily understood that the clutch may be freed with the transmission mechanism in an infinitely large number of positions.

One of the objects of the present invention is to provide means whereby accurate control may be easily exerted over the position in which a plant is planted so facilitating, inter alia, the planting of a series of rows of plants with the corresponding plants in each row in transverse alignment with another.

Other objects will be in part obvious and in part hereinafter pointed out in connection with the following analysis of this invention.

In order that the present invention may be well understood one embodiment will now be described, by way of example only, with reference to the accompanying drawing in which:

Figure 1 is a rear perspective view of the machine,

Figure 2 is a detail view of the cam disc employed in the machine shown in Figure 1, Figure 3 is a detail view of the control means associated with the cam disc shown in Figure 2, Figure 4 is an enlarged view of part of the transmission mechanism shown in Figure 1, and Figure 5 is a similar view showing such part in another position.

The planting machine shown in Figure 1 consists of a frame 1 mounted on road wheels 2, 2', and having planting mechanism comprising conveyors 3 and plant gripping devices 4. Planting machines having these features are already known and it is to be understood that the present invention may be applied to machines having different means for gripping, conveying and delivering the plants to their planting positions. The machine shown in Figure 1 also includes an adjustable soil pressing wheel 5 but this is also an optional feature in the present invention.

The road wheel 2 is mounted on an axle 6 journalled in the frame 1 and drive transmission from said axle to the plant conveying and planting mechanism is through bevel wheels 7 and 8. The road wheel 2' and the soil pressing wheel 5 are carried on stub axles and can be moved either into their co-operating and soil pressing positions or into positions appropriate for ordinary travel of the machine for instance along a road, the lever 9 being provided for controlling this movement.

The above-mentioned bevel wheel 7 is freely mounted on the driving axle 6 and mechanism incorporating a clutch is provided between said axle and said bevel wheel. In the embodiment illustrated in the drawings this mechanism includes a ratchet wheel 10 rigidly mounted on the axle 6 and a co-operating pawl 11 pivotally mounted in a pawl-holder 12, said pawl-holder 12 being rigidly fitted to or formed integrally with the bevel wheel 7 so that it turns therewith and said pawl 11 being urged by means of a spring into engagement with the ratchet teeth so completing the drive from the axle 6 to the bevel wheel 8.

A cam disc 13 shown in detail in Figure 2, is freely mounted on the axle 6 and is slidable towards and away from the ratchet wheel 10. When said cam disc is moved against the ratchet wheel 10 the four cam surfaces developed on said disc are located in registration with the overhanging part of the pawl 11 but when said cam disc is moved to its limit position away from said ratchet the cam surfaces are moved out of registration with said pawl. A stop 14 is provided for maintaining the aforesaid cam disc in the selected one of its two positions. Said stop 14 has an inturned end portion which abuts against the face of the bush 14' Figure 2 when the cam disc is in its innermost position as shown in Figures 1 and 2 and enters the groove 15 in said bush when the disc is in its outermost position as shown in Figure 5, said stop being detachably fitted to the machine for instance by means of the bolt 16 so that the change over can be easily effected.

A plate 17, shown in detail in Figure 3, includes an arcuate inner part which fits around the bush 14' of the cam disc 13 and is secured to the face of the disc by bolts passing through holes in said disc and in said plate, said holes being shown in Figures 2 and 3 and one of the bolts being designed by numeral 18' in Figures 1, 4 and 5.

The end of the plate 17 opposite to that having the above-mentioned arcuate portion is provided with two projecting lugs 18, 18 (see Figure 3) forming a fork which passes over a stop, such for instance as the member 23 forming a part of the chassis of the machine, the fork being of sufficient width to permit of limited angular movement of said cam disc 13 about the axle 6 on which it is mounted.

A connecting rod 19, shown in detail in Figure 3, has an out-turned lower end adapted to enter a hole in the upper lug 18 of the plate 17 and an out-turned upper end adapted to engage with a small crank arm 20 fitted to the shaft of the crank arm 21, the latter constituting the manually operable control of the automatic clutch mechanism.

A pointer 22 at the right of Figure 1 is adjustably fitted to the machine, the position indicated by such pointer being that in which a plant will be delivered at the moment of actuation of the control 21.

Assuming that it is desired to operate the above machine with the mechanism for enabling the operator to control the exact positioning of the plants in operation the mechanism is set in the position shown in Figures 1 and 4, i. e., with the cam disc 13 held against the ratchet 10. As the machine is moved forwardly, for instance by being drawn by a tractor the pawl 11 will ride up the first cam surface it meets so moving out of engagement with the ratchet wheel and movement of the machine will impart no movement to the actual plant conveying and planting mechanism. When the operator observes that the pointer 22 indicates the position in which it is desired to locate a plant he rocks the control 21 and then immediately releases it. The action of rocking the control 21 causes the cam disc 13 to rotate on the axle 6 to the extent permitted by the lugs 18 on the plate 17 and this is sufficient to move the crest of the cam surface from its position under the pawl 11. Owing to the sharp drop in the cam contour the pawl at once drops into engagement with the teeth on the ratchet wheel 10 and owing to the large periphery of the ratchet wheel 10 and the large number of teeth thereon the pick-up of the drive is substantially instantaneous. Immediately the pawl 11 engages the ratchet wheel 10 movement of the machine imparts movement to the plant feeding and planting mechanism and the machine is so timed that the actual planting occurs during the movement immediately following the initial engagement of the pawl, i. e., the point indicated by the pointer 22 at the moment of operating the control 21 is in all material respects the exact point at which a plant will be planted.

Continued movement of the machine with the pawl 11 in engagement will result in another plant being brought towards its planting position but prior to the actual planting taking place the pawl 11 meets the rise of the next cam surface on the cam disc 13 so restoring such disc to its initial angular position and thereafter riding up that surface and bringing about its automatic disengagement from the ratchet wheel 10. The plant conveying and planting mechanism therefore comes to rest with a plant ready for release immediately the control 21 is again actuated. If desired a spring 24 may be provided for restoring the cam disc 13 to its initial position either in addition to or instead of relying upon movement of the pawl for effecting such restoration.

In the above described machine the planting mechanism goes through the cycle pertaining to the planting of a single plant between the time when the pawl drops from the crest of one cam surface and the time when it reaches the crest of the succeeding one, i. e., the operator has control over the delivery of each individual plant. If desired, however, the arrangement may be such that a group consisting of two or more plants is planted for each operation of the clutch in which case the operator has control over the positioning of each separate group of plants.

Whilst some examples of planting machines according to the present invention have been hereinbefore described it is to be understood that the specific details may be varied or modified without departing from the scope of such invention.

I claim:

1. A planting machine comprising a wheeled vehicle, a drive shaft, transmission and plant conveying and planting mechanisms, said mechanisms including a clutch, a hand-operated control device for effecting engagement of said clutch, and means for effecting the automatic disengagement of said clutch after the drive transmitted would result in the planting of a predetermined number of plants, and means for maintaining said clutch in its disengaged position until such time as said hand control device is operated for effecting re-engagement.

2. A planting machine comprising a wheeled vehicle, a drive shaft, transmission and plant conveying and planting mechanisms, said mechanisms including a clutch consisting of a pawl and ratchet mechanism, a hand-operated control device for effecting engagement of said pawl and ratchet mechanism, and means operated by the road wheels of said vehicle for automatically disengaging said pawl and ratchet mechanism after the drive transmitted would result in the planting of a predetermined number of plants and maintaining said pawl and ratchet mechanism in disengaged position until such time as said hand control device is operated for effecting re-engagement.

3. A planting machine as claimed in claim 2 wherein the pawl and ratchet mechanism comprises a ratchet wheel mounted on the road wheel axle, and a pawl pivotally carried by a part of the drive transmission to the plant conveying and/or planting mechanism, and a clutch releasing means comprising a cam disc having cam surfaces adapted to urge said pawl out of engagement with said ratchet wheel or permit it to move into engagement therewith dependent upon the position of said cam surfaces with respect to said pawl.

4. A planting machine as claimed in claim 2 wherein the pawl and ratchet mechanism comprises a ratchet wheel mounted on the road wheel axle, and a pawl pivotally carried by a part of the drive transmission to the plant conveying and/or planting mechanism, and a clutch releasing means comprising a cam disc having cam surfaces adapted to urge said pawl out of engagement with said ratchet wheel or permit it to move into engagement therewith dependent upon the position of said cam surfaces with respect to said pawl, said cam disc being mounted coaxially with said ratchet wheel.

5. A planting machine as claimed in claim 2 wherein the pawl and ratchet mechanism comprises a ratchet wheel mounted on the road wheel axle, and a pawl pivotally carried by a part of the drive transmission to the plant conveying and/or planting mechanism, and a clutch releasing means comprising a cam disc having cam surfaces adapted to urge said pawl out of engagement with said ratchet wheel or permit it to move into engagement therewith dependent upon the position of said cam surfaces with respect to said pawl, said cam disc being mounted coaxially with said ratchet wheel so that it can undergo limited angular movement, and means provided for moving said cam disc within the limits of said movement thereby to allow the pawl to make re-engagement with the ratchet wheel at the desired moment after automatic disengagement has taken place.

6. A planting machine as claimed in claim 2 wherein the pawl and ratchet mechanism comprises a ratchet wheel mounted on the road wheel axle, and a pawl pivotally carried by a part of the drive transmission to the plant conveying and/or planting mechanism, and a clutch releasing means comprising a cam disc having cam surfaces adapted to urge said pawl out of engagement with said ratchet wheel or permit it to move into engagement therewith dependent upon the position of said cam surfaces with respect to said pawl, said cam disc being mounted coaxially with said ratchet wheel so that it can undergo limited angular movement, and means provided for moving said cam disc within the limits of said movement thereby to allow the pawl to make re-engagement with the ratchet wheel at the desired moment after automatic disengagement has taken place, said last-mentioned means including a control rod suitably positioned on the machine for being manually operated by the user of such machine.

7. A planting machine as claimed in claim 2 wherein the pawl and ratchet mechanism comprises a ratchet wheel mounted on the road wheel axle, and a pawl pivotally carried by a part of the drive transmission to the plant conveying and/or planting mechanism, and a clutch releasing means comprising a cam disc having cam surfaces adapted to urge said pawl out of engagement with said ratchet wheel or permit it to move into engagement therewith dependent upon the position of said cam surfaces with respect to said pawl, said cam disc being mounted coaxially with said ratchet wheel so that it can undergo limited angular movement, and means provided for moving said cam disc within the limits of said movement thereby to allow the pawl to make re-engagement with the ratchet wheel at the desired moment after automatic disengagement has taken place, said means for limiting the angular movement of the cam disc comprising a forked member rigidly mounted with respect to said cam disc and passing around a part of the chassis of the machine, the width of the fork being greater than the width of the part engaged by an amount permitting of the desired angular movement of the cam disc.

8. A planting machine as claimed in claim 2 wherein the pawl and ratchet mechanism comprises a ratchet wheel mounted on the road wheel axle, and a pawl pivotally carried by a part of the drive transmission to the plant conveying and/or planting mechanism, and a clutch releasing means comprising a cam disc having cam surfaces adapted to urge said pawl out of engagement with said ratchet wheel or permit it to move into engagement therewith dependent upon the position of said cam surfaces with respect to said pawl, said cam disc being mounted coaxially with said ratchet wheel, said cam disc being also movable axially whereby it can be moved out of coaction with said pawl in the event of its being desired to cut out the automatic operation of the clutch.

9. A planting machine as claimed in claim 2 wherein the pawl and ratchet mechanism comprises a ratchet wheel mounted on the road wheel axle, and a pawl pivotally carried by a part of the drive transmission to the plant conveying and/or planting mechanism, and a clutch releasing means comprising a cam disc having cam surfaces adapted to urge said pawl out of engagement with said ratchet wheel or permit it to move into engagement therewith dependent upon the position of said cam surfaces with respect to said pawl, said cam disc being mounted coaxially with said ratchet wheel, said cam disc being also movable axially whereby it can be moved out of coaction with said pawl in the event of its being desired to cut out the automatic operation of the clutch, and a stop for locking said cam disc in the selected one of its two positions.

ISRAEL POMIERANIEC.